United States Patent
Hwang et al.

(10) Patent No.: US 8,860,694 B2
(45) Date of Patent: Oct. 14, 2014

(54) LIGHT SENSING ASSEMBLY AND INTERACTIVE DISPLAY DEVICE HAVING THE SAME

(75) Inventors: Seong-Mo Hwang, Seongnam-si (KR); Moon-Gyu Lee, Suwon-si (KR); Hyeon-Yong Jang, Hwaseong-si (KR); Jae-Jin Pyun, Hwaseong-si (KR); Il-Ho Lee, Hwaseong-si (KR); Moon-Jung Baek, Suwon-si (KR)

(73) Assignee: Samsung Display Co., Ltd. (KR)

( * ) Notice: Subject to any disclaimer, the term of this patent is extended or adjusted under 35 U.S.C. 154(b) by 315 days.

(21) Appl. No.: 13/239,888

(22) Filed: Sep. 22, 2011

(65) Prior Publication Data

US 2012/0229422 A1    Sep. 13, 2012

(30) Foreign Application Priority Data

Mar. 9, 2011    (KR) .................. 10-2011-0020780

(51) Int. Cl.
*G06F 3/042*    (2006.01)
*F21V 8/00*    (2006.01)

(52) U.S. Cl.
CPC .... *G02B 6/0068* (2013.01); *G06F 2203/04109* (2013.01); *G06F 3/0421* (2012.01); *G02B 6/0073* (2013.01)
USPC ........... 345/175; 345/156; 345/173; 345/174; 345/176; 345/87; 345/177; 345/88; 345/89

(58) Field of Classification Search
USPC .......................................... 345/175, 156, 173
See application file for complete search history.

(56) References Cited

U.S. PATENT DOCUMENTS

| | | | |
|---|---|---|---|
| 7,548,677 B2 * | 6/2009 | Bathiche et al. | 385/129 |
| 7,777,834 B2 * | 8/2010 | Uehara et al. | 349/68 |
| 8,384,694 B2 * | 2/2013 | Powell et al. | 345/175 |
| 8,736,581 B2 * | 5/2014 | Han et al. | 345/175 |
| 2010/0007632 A1 * | 1/2010 | Yamazaki | 345/175 |
| 2010/0231498 A1 * | 9/2010 | Large et al. | 345/102 |
| 2010/0302196 A1 * | 12/2010 | Han et al. | 345/173 |
| 2012/0127128 A1 * | 5/2012 | Large et al. | 345/175 |

FOREIGN PATENT DOCUMENTS

| | | |
|---|---|---|
| JP | 2009-093616 A | 4/2009 |
| KR | 10-2008-0047048 A | 5/2008 |
| KR | 10-2009-0060283 A | 6/2009 |

* cited by examiner

*Primary Examiner* — Grant Sitta
(74) *Attorney, Agent, or Firm* — Cantor Colburn LLP

(57) ABSTRACT

A light sensing assembly includes a first light guide plate ("LGP"), a light-emitting diode ("LED") part, an infrared LED part, a second LGP and a first sensor array. The LED part is at a side portion of the first LGP and emits white lights of a displayed image. The infrared LED part emits infrared lights of a detected touch. The second LGP is below the first LGP. The second LGP guides a path of the infrared lights of the detected touch inputted in accordance with a touch operation. The first sensor array is at a side portion of the second LGP and senses the reflected infrared lights which are guided by the second LGP.

20 Claims, 4 Drawing Sheets

LIGHT SENSING ASSEMBLY AND INTERACTIVE DISPLAY DEVICE HAVING THE SAME

This application claims priority to Korean Patent Application No. 2011-0020780, filed on Mar. 9, 2011, and all the benefits accruing therefrom under 35 U.S.C. §119, the contents of which are herein incorporated by reference in their entirety.

BACKGROUND OF THE INVENTION

1. Field of the Invention

Exemplary embodiments of the invention relate to a light sensing assembly and an interactive display device having the light sensing assembly. More particularly, exemplary embodiments of the invention relate to a light sensing assembly capable of realizing an interactive display device in low manufacturing costs and an interactive display device having the light sensing assembly.

2. Description of the Related Art

Generally, liquid crystal display ("LCD") devices have various characteristics such as being relatively thin, having light weight, and low power consumption, and thus they have become widely used in monitors, notebooks, cell phones, etc. An LCD device includes an LCD panel displaying an image using the light transmissivity properties of liquid crystal and a backlight assembly below the LCD panel to provide the LCD panel with light.

The LCD panel typically includes an array substrate, an opposite substrate and a liquid crystal layer. The array substrate typically includes a signal line, a thin-film transistor ("TFT") and a pixel electrode. The opposite substrate typically includes a common electrode. The opposite substrate faces the array substrate. The liquid crystal layer is interposed between the array substrate and the opposite substrate.

A touch screen display panel may be made by integrating a touch electrode and a sensing line on the LCD panel in order to detect a position signal through externally applied pressure. When pressure is applied onto the touch screen display panel by an object such as a finger, a pen, etc., a position signal corresponding to the position onto which the pressure is applied through the touch electrode is generated, and the position signal is read-out through the sensing line. The position signal may be formed when the capacitance of a capacitor between the common and the touch electrodes is changed due to the externally applied pressure. Alternatively, the position signal may be formed by contacting the common electrode with the touch electrode.

However, a touch electrode or a sensing line is formed on the touch screen display panel, so that the number of masks for forming the touch electrode and the sensing line is increased. Thus, a manufacturing process is complicated and a manufacturing cost is also increased.

Moreover, an aperture ratio of the touch screen display panel is decreased due to the touch electrode or the sensing line.

Furthermore, switching elements for a display are adjacent to the touch electrode for sensing a touch on an LCD panel, so that an electric noise may be generated in the touch screen display panel.

BRIEF SUMMARY OF THE INVENTION

Exemplary embodiments of the invention provide a light sensing assembly capable of realizing an interactive display device in a low manufacturing cost by preventing the decrease of an aperture ratio, and by reducing or effectively preventing an electric noise from being generated.

Exemplary embodiments of the invention also provide an interactive display device having the above-mentioned light sensing assembly.

According to an exemplar embodiment of the invention, a light sensing assembly includes a first light guide plate ("LGP"), a light-emitting diode ("LED") part, an infrared LED part, a second LGP and a first sensor array. The LED part is at a side portion of the first LGP and emits white lights of a displayed image. The infrared LED part emits infrared lights of a detected touch. The second LGP is below the first LGP. The second LGP guides a path of the infrared lights of the detected touch inputted in accordance with a touch operation. The first sensor array is at a side portion of the second LGP and senses the infrared lights which are guided by the second LGP.

According to another exemplary embodiment of the invention, an interactive display device includes a display panel, a first LGP, a white LED part, an infrared LED part, a second LGP and a first sensor array. The first LGP is below the display panel. The white LED part is at a side portion of the first LGP and emits white lights. The first light guide plate guides a path of the white lights to the display panel which displays an image. The infrared LED part emits infrared lights. The second LGP is below the first LGP. The second LGP guides a path of the infrared lights reflected in a touch operation at the display panel. The first sensor array is at a side portion of the second LGP and senses the reflected infrared lights which are guided by the second LGP.

According to still another exemplary embodiment of the invention, an interactive display device includes a display panel, a first LGP, a white LED part, an infrared LED part, a second LGP, a third LGP, a first sensor array and a second sensor array. The first LGP is below the display panel. The white LED part is at a side portion of the first LGP and emits white lights for displaying an image. The infrared LED part is at a first side of the first LGP and emits infrared lights. The second LGP is below a first area of the first LGP. The second LGP guides a path of the infrared lights reflected in a touch operation at the display panel. The third LGP is below a second area of the first LGP. The third LGP guides a path of the reflected infrared lights. The first sensor array is at a first side portion of the second LGP and senses infrared lights which are guided by the second LGP. The second sensor array is at a first side portion of the third LGP and senses the reflected infrared lights which are guided by the third LGP.

According to a light sensing assembly and an interactive display device having the light sensing assembly, wedge type LGPs which guide infrared lights for detecting a touch are below an LGP which guides white lights for displaying an image, and a stripe sensor array which senses lights for detecting a touch is at a side surface of the wedge type LGP, so that a touch detection operation is performed without modification of an LCD panel. Thus, since the LCD panel does not include a touch electrode or a sensing line, an interactive display device may be realized without a decrease of an aperture ratio of the LCD panel and generation of an electric noise may be reduced or effectively prevented.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION OF THE INVENTION

Figure 1:
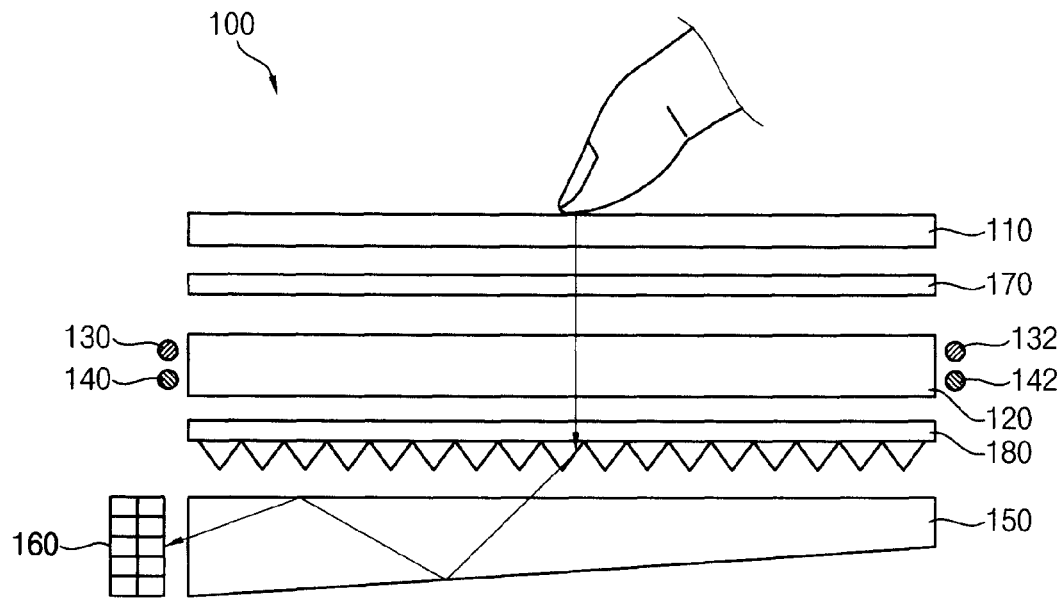
FIG. 1 is a cross-sectional view schematically illustrating an exemplary embodiment of an interactive display device according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "under," "above," and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "under" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2:
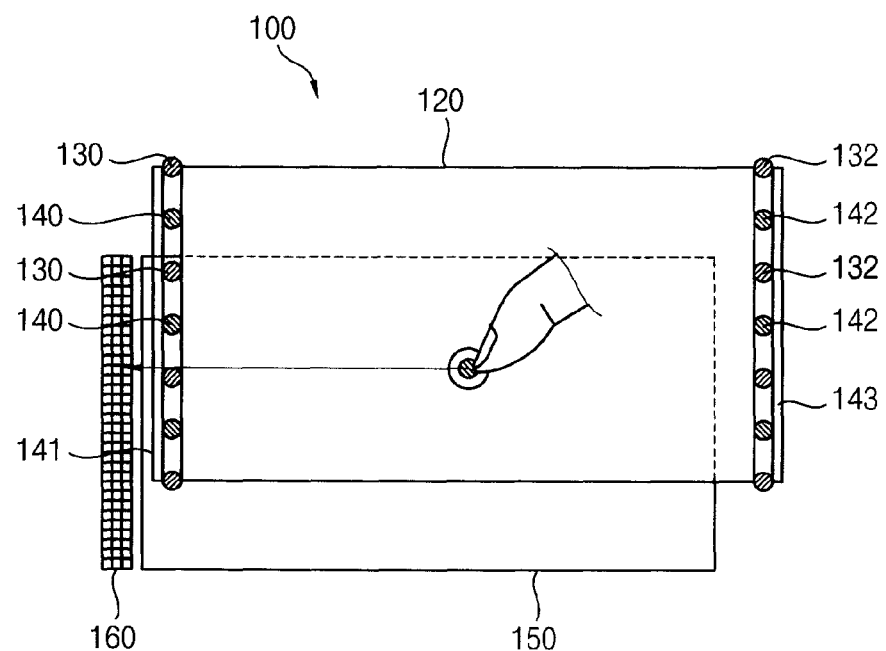
FIG. 2 is a plan view schematically illustrating the interactive display device of FIG. 1.

FIG. 1 is a cross-sectional view schematically illustrating an exemplary embodiment of an interactive display device 100 according to the invention. FIG. 2 is a plan view schematically illustrating the interactive display device 100 of FIG. 1.

Referring to FIGS. 1 and 2, the interactive display device 100 according to the invention includes a liquid crystal display ("LCD") panel 110, a first light guide plate ("LGP") 120, a first white light-emitting diode ("LED") part 130, a second white LED part 132, a first infrared LED part 140, a second infrared LED part 142, a second LGP 150 and a first sensor array 160. In the illustrated exemplary embodiment, the first and second LGPs 120 and 150, the first and second white LED parts 130 and 132, the first and second infrared LED parts 140 and 142 and the first sensor array 160 are below the LCD panel 110 and define a light sensing assembly which emits white lights for displaying an image and infrared light for detecting a touch.

An LCD panel 110 includes an array substrate (not shown), a color filter substrate (not shown) and a liquid crystal layer (not shown) between the array substrate and the color filter substrate.

The array substrate includes a plurality of data lines, a plurality of gate lines, a plurality of switching elements and a plurality of pixel electrodes. In one exemplary embodiment, for example, the array substrate includes I×J switching elements that are respectively connected to I data lines and J gate lines, and I×J pixel electrodes that are connected to the switching elements. In this case, 'I' and 'J' are natural numbers.

The color filter substrate includes a plurality of color filters and a common electrode. Thus, the LCD panel 110 includes I×J pixels. A data driving part (not shown) provides I data lines with a data voltage, and a gate driving part (not shown) sequentially provides J gate lines with J gate signals. Thus, the LCD panel 110 including I×J pixels is driven.

The first LGP 120 is below the LCD panel 110, such as overlapping the LCD panel 110 and/or under a plane of the LCD panel 110. The first LGP 120 has a substantially flat shape. The first LGP 120 includes a polymer resin having various characteristics such as high light transmittance, high heat resistance, high chemical resistance, high mechanical strength, etc. Examples of the high polymer resin that may be used for the first LGP 120 may include polymethylmethacrylate, poly carbonate ("PC"), polyamide, polyimide, polypropylene, polyurethane, etc. These may be used alone or in a combination thereof. A lenticular lens (not shown) may be further on a light exiting surface of the first LGP 120 in order to increase a straightness of infrared lights generated from the first and second infrared LED parts 140 and 142 and traveling through the first LGP 120. The direction of a top portion of the lenticular lens may be substantially perpendicular to an array direction of the first infrared LED part 140 and/or the second infrared LED part 142.

The first white LED part 130 includes a plurality of white LEDs at a first side portion of the first LGP 120, and generates and emits white lights for displaying an image, to the first LGP 120.

The second white LED part 132 includes a plurality of white LEDs at a second side portion of the first LGP 120, and generates and emits white lights for displaying an image, to the first LGP 120. In the illustrated exemplary embodiment, the white lights for displaying an image emitted from the first and second white LED parts 130 and 132 are guided by the first LGP 120 and are provided to the LCD panel 110 or the second LGP 150.

The white LED part 130 may include at least one white LED including a blue LED which generates and emits a blue light and a yellow fluorescent substance to collectively emit white lights. Alternatively, the white LED part 130 may collectively include at least one red LED which generates and emits a red light, at least one green LED which generates and emits a green light, and at least one blue LED which generates and emits a blue light. The red, green and blue lights are mixed and provided to the LCD panel 110 as white lights.

The first infrared LED part 140 includes a plurality of infrared LEDs at the first side portion of the first LGP 120, and generates and emits infrared lights used for detecting a touch to the first LGP 120. The first infrared LED part 140 may be parallel with the first white LED part 130. In one exemplary embodiment, infrared LEDs of the first infrared LED part 140 and white LEDs of the first white LED part 130 may be alternately on a same line and/or in a same plane. In another exemplary embodiment, infrared LEDs of the first infrared LED part 140 and white LEDs of the first white LED part 130 may be on different lines and/or different planes.

The second infrared LED part 142 includes a plurality of infrared LEDs at the second side portion of the first LGP 120, and generates and emits infrared lights used for detecting a touch to the first LGP 120. The second infrared LED part 142 may be parallel with the second white LED part 132. In one exemplary embodiment, infrared LEDs of the second infrared LED part 142 and white LEDs of the second white LED part 132 may be alternately on a same line and/or in a same plane. In another exemplary embodiment, infrared LEDs of the second infrared LED part 142 and white LEDs of the second white LED part 132 may be on different lines and/or on different planes.

The first white LED part 130 and the first infrared LED part 140 may be on first surface of a single first base substrate 141, and face a first incident surface of the first LGP 120. The second white LED part 132 and the second infrared LED part 142 may be on a first surface of a single second base substrate 143, and face a second incident surface of the first LGP 120. The first surfaces of the base substrates 141 and 143 may face each other and oppose each other with respect to the first LGP 120. The first white LED part 130 and the first infrared LED part 140 are arranged in the longitudinal direction of the first base substrate 141, that is, in an array direction. The second white LED part 132 and the second infrared LED part 142 are arranged in the longitudinal direction of the second base substrate 143, that is, in an array direction.

The infrared lights for detecting a touch emitted from the first and second infrared LED parts 140 and 142 are guided by the first LGP 120 and provided to the LCD panel 110.

The second LGP 150 is below the first LGP 120, such as overlapping the first LGP 120 and/or further away from the LCD panel 110 than the first LGP 120 on a different plane than the first LGP 120. The second LGP 150 guides a path of infrared lights inputted in accordance with a touch operation to provide the first sensor array 160 with the guided light. The second LGP 150 has a wedge shape, for example, in a cross-sectional view. The second LGP 150 may include a polymer resin having various characteristics such as high light transmittance, high heat resistance, high chemical resistance, high mechanical strength, etc.

The first sensor array 160 has a stripe shape which is a long, narrow band, is at a side portion of the second LGP 150, and senses infrared lights guided by the second LGP 150. The first sensor array 160 is adjacent to the side portion of the wedge shaped second LGP 150 having a larger thickness.

The exemplary embodiment of the interactive display device 100 according to the invention may further include a diffusion sheet 170 between the LCD panel 110 and the first LGP 120.

The exemplary embodiment of the interactive display device 100 according to the invention may further include a turning film 180 between the first LGP 120 and the second LGP 150. A reflection film may be integrated on the turning film 180. The turning film 180 is below the first LGP 120 to reflect the white lights emitted from the first LGP 120 toward the LCD panel 110. In addition, the turning film 180 transmits the infrared lights which exit through surfaces of the first LGP 120 and are subsequently used in detecting a touch. That is, the turning film 180 provides the second LGP 150 with the infrared lights which are inputted in accordance with a touch operation. The turning film 180 has an inverted prism film shape. A plurality of prism units is on a light incident surface of the turning film 180 which receives lights exit through the first LGP 120. Each of the prism units includes a first prism surface which receives lights and a second prism surface which reflects lights.

The turning film 180 of the invention may include polymeric materials having indices of refraction ranging typically from about 1.42 to about 1.64, and may be from about 1.47 to about 1.55. Possible polymer compositions include, but are not limited to: poly(methyl methacrylate)s, poly(cyclo-olefin)s, polycarbonates, polysulfones and various co-polymers comprising various combinations of acrylate, alicyclic acrylate, carbonate, styrenic, sulfone and other moieties that are known to impart desirable optical properties, particularly high transmittance in the visible range and low level of haze. Various miscible blends of the aforementioned polymers are also possible material combinations that can be used in the invention. The polymer compositions may be either thermoplastic or thermosetting. The former are manufacturable by an appropriate melt process that requires good melt processability while the latter can be fabricated by an appropriate ultraviolet ("UV") cast and a cure process or a thermal cure process.

Hereinafter, an exemplary embodiment of a display operation for displaying an image and a touch operation for detecting a touch is described.

In a display operation, white lights for displaying images emitted from the first and second white LED parts 130 and 132 are guided by the first LGP 120 and provided to the diffusion sheet 170 or the turning film 180. The white lights for displaying images provided to the turning film 180 are reflected to again be incident to the first LGP 120. The white lights for displaying images which are incident at the diffusion sheet 170 are diffused and provided to the LCD panel 110. The LCD panel 110 displays images by using the white lights for displaying images.

In a touch operation, infrared lights for detecting a touch emitted from the first and second infrared LED parts 140 and 142 are guided by the first LGP 120 and provided to the diffusion sheet 170.

The infrared lights for detecting a touch which are incident at the diffusion sheet 170 are diffused and provided to the LCD panel 110.

Infrared lights for detecting a touch transmitted through the diffusion sheet 170 and the LCD panel 110 are reflected by a reflection substance for touching such as a finger, a pen, etc., and are provided to the second LGP 150 via the sequential elements of the LCD panel 110, the diffusion sheet 170, the first LGP 120 and the turning film 180.

Infrared lights incident at the second LGP 150 are provided to the first sensor array 160, and the first sensor array 160 senses the infrared lights. Although not shown in FIGS. 1 and 2, the interactive display device 100 may further include a touch detection controller. The touch detection controller may calculate a position of a touch occurred from, based on a sensing time, a sensing position, etc., of infrared light sensed by the first sensor array 160.

The exemplary embodiment of the interactive display device 100 according to the invention may further include a first lenticular lens between the second LGP 150 and the first sensor array 160. A detailed description of the first lenticular lens will be described in FIG. 3 which is described below.

According to an exemplary embodiment of the invention, white LEDs and infrared LEDs are respectively at opposing side surfaces facing each other of a flat type LGP which guides white lights for displaying images, and a wedge type LGP which guides infrared lights for detecting a touch is below the flat type LGP. In addition, a stripe sensor array which senses lights for detecting a touch is at a side surface of the wedge type LGP, so that a touch detection operation is performed without modification of an LCD panel.

Thus, since a touch electrode or a sensing line is not formed on an LCD panel, an interactive display device may be realized without a decrease of an aperture ratio of an LCD panel.

Moreover, since a mask, a material, an additional process, etc., for forming a touch electrode or a sensing line on an LCD panel are not required, a manufacturing cost of an interactive display device may be decreased.

Furthermore, since a touch electrode or a sensing line is not formed on an LCD panel, it may reduce or effectively prevent an electric noise, which is generated by switching elements for a display and a touch electrode for sensing a touch that are formed on an LCD panel, from being generated. Therefore, display characteristics of the interactive display device may be enhanced.

Figure 3:
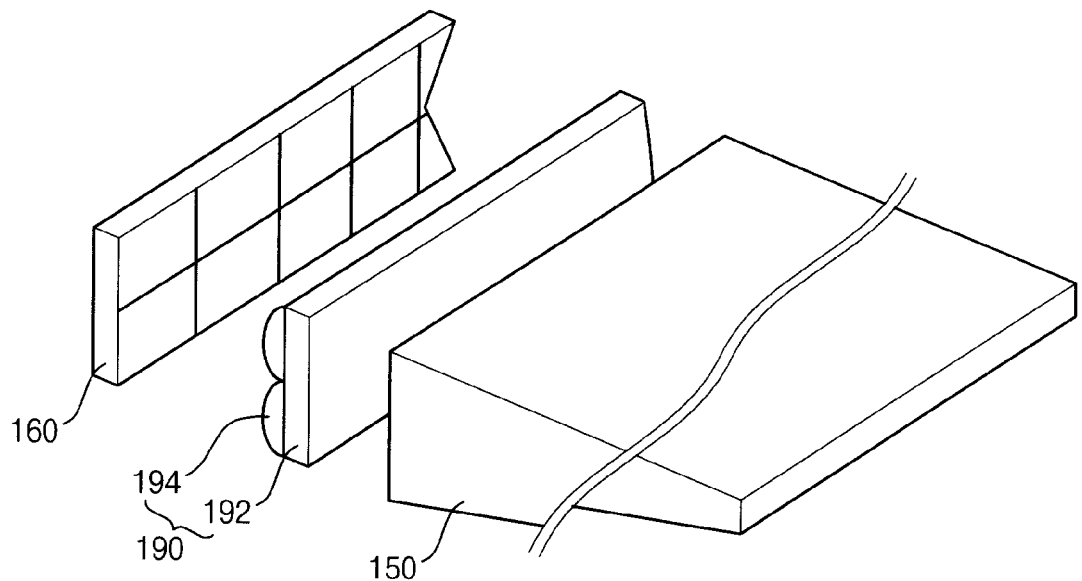
FIG. 3 is an exploded perspective view schematically illustrating an exemplary embodiment of the interactive display device shown in FIG. 1, in which a first lenticular lens array sheet is between a first sensor array and a second light guide plate.

FIG. 3 is an exploded perspective view schematically illustrating an exemplary embodiment of the interactive display device in which a first lenticular lens array sheet is between the first sensor array 160 and the second light guide plate 150 as shown in FIG. 1.

Referring to FIGS. 1 to 3, a lenticular lens array 190 between the first sensor array 160 and the second LGP 150 includes a third base substrate 192, and a plurality of lenticular lenses 194 on the third base substrate 192.

The third base substrate 192 includes a polymer resin having various characteristics such as high light transmittance, high heat resistance, high chemical resistance, high mechanical strength, etc. A width and a length of the third base substrate 192 may correspond to a width and a length of the side portion of the second LGP 150.

The lenticular lenses 194 may guide a path of lights incident into the third base substrate 192 toward the first sensor array 160 in a substantially uniform manner. The lenticular lenses 194 may include a same material as the third base substrate 192. The lenticular lenses 194 may be integrated with the third base substrate 192, such that the lens array 190 is a unitary, indivisible member; however, the invention is not limited thereto. In the illustrated exemplary embodiment, the lenticular lenses 194 are on a first surface of the third base substrate 192 in a stripe shape; however, the arrangement of the lenticular lenses 194 is not limited thereto.

Figure 4:
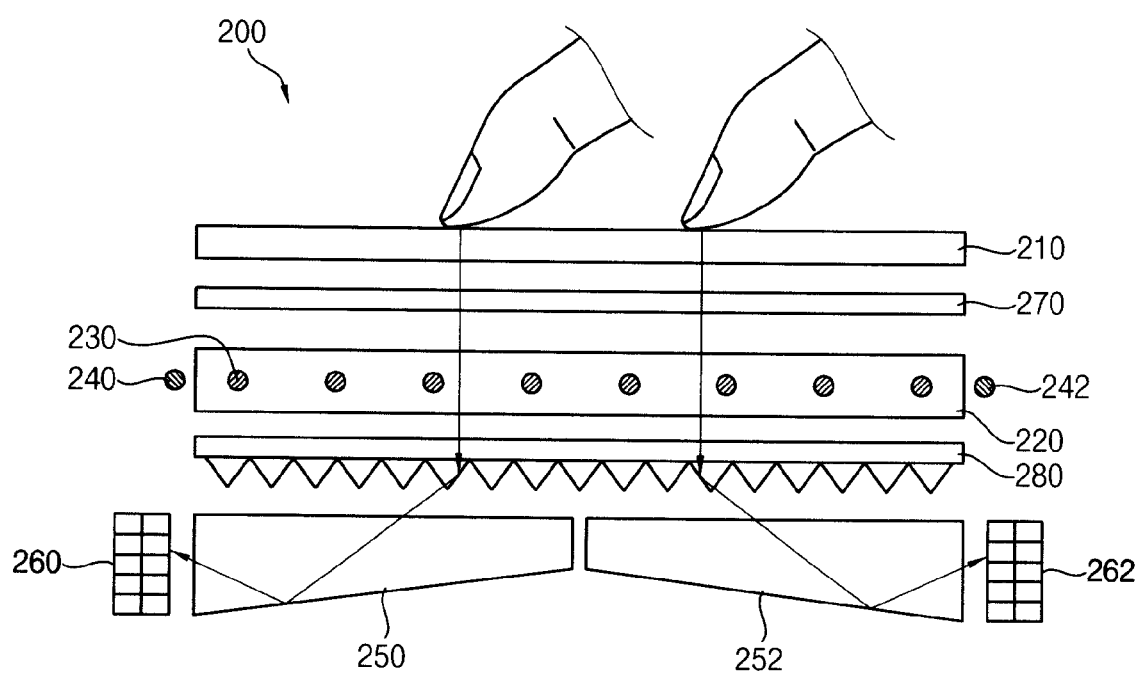
FIG. 4 is a cross-sectional view schematically illustrating another exemplary embodiment of an interactive display device according to the invention.
Figure 5:
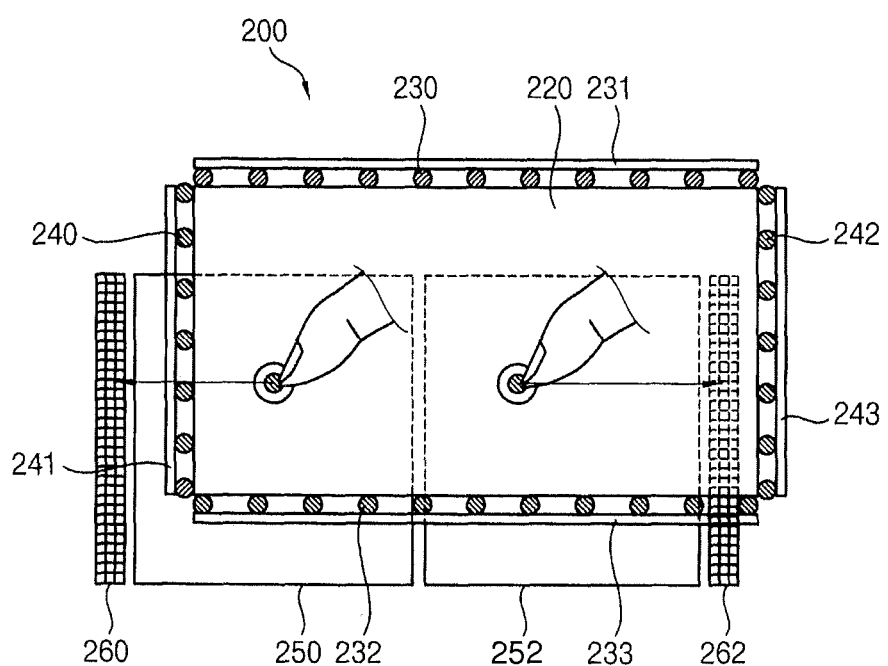
FIG. 5 is a plan view schematically illustrating the interactive display device of FIG. 4.

FIG. 4 is a cross-sectional view schematically illustrating another exemplary embodiment of an interactive display device according to the invention. FIG. 5 is a plan view schematically illustrating the interactive display device of FIG. 4.

Referring to FIGS. 4 and 5, an interactive display device 200 according to the invention includes an LCD panel 210, a first LGP 220, a first white LED part 230, a second white LED part 232, a first infrared LED part 240, a second infrared LED part 242, a second LGP 250, a third LGP 252, a first sensor array 260 and a second sensor array 262. In the illustrated exemplary embodiment, the first to third LGPs 220, 250 and 252, the first and second white LED parts 230 and 232, the first and second infrared LED parts 240 and 242 and the first and second sensor arrays 260 and 262 are below the LCD panel 210 and define as a light sensing assembly which emits white lights for displaying an image and infrared light for detecting a touch.

The LCD panel 210 is substantially the same as the LCD panel 110 of FIGS. 1 and 2, and thus a detailed description thereof will be omitted.

The first LGP 220 is below the LCD panel 210. The first LGP 220 has a substantially flat shape. The first LGP 220 includes a polymer resin having various characteristics such as high light transmittance, high heat resistance, high chemical resistance, high mechanical strength, etc. A lenticular lens (not shown) may be further on a light exiting surface of the first LGP 220 in order to increase a straightness of infrared lights emitted from the first and second infrared LED parts 240 and 242. The direction of a top portion of the lenticular lens may be substantially perpendicular to an array direction which is parallel to a transverse direction of the first LGP 220, of the first infrared LED part 240 or the second infrared LED part 242. That is, the top portion of the lenticular lens may be extended along a horizontal direction parallel to a longitudinal direction of the first LGP 220 when viewed from a plan view of the interactive display device of FIG. 5.

The first white LED part 230 includes a plurality of white LEDs at a first side portion of the first LGP 220, and emits white lights for displaying an image, to the first LGP 220.

The second white LED part 232 includes a plurality of white LEDs at an opposing second side portion of the first LGP 220, and emits white lights for displaying an image, to the first LGP 220. The second side portion of the first LGP 220 at which the second white LED part 232 is disposed may face the first side portion of the first LGP 220 at which the first white LED part 230 is disposed.

The first infrared LED part 240 includes a plurality of infrared LEDs at a first side portion of the first LGP 220, and emits infrared lights for detecting a touch to the first LGP 120.

The second infrared LED part 242 includes a plurality of infrared LEDs at an opposing second side portion of the first LGP 220, and emits infrared lights for detecting a touch, to the first LGP 220. The second side portion of the first LGP 220 at which the second infrared LED part 242 is disposed may face the first side portion of the first LGP 220 at which the first infrared LED part 240 is disposed.

The first white LED part 230 may be on first surface of a single first base substrate 231, and face a first incident surface of the first LGP 220. The second white LED part 232 may be on first surface of a single second base substrate 233, and face a second incident surface of the first LGP 220. The first surfaces of the first and second base substrates 231 and 233 may face each other and oppose each other with respect to the first LGP 220. The first infrared LED part 240 may be on first surface of a single third base substrate 241, and face a third incident surface of the first LGP 220. The second infrared LED part 242 may be on first surface of a single fourth base substrate 243, and face a fourth incident surface of the first LGP 220. The first surfaces of the third and fourth base substrates 241 and 243 may face each other and oppose each other with respect to the first LGP 220.

The second LGP 250 is below (e.g., overlaps) a first area of the first LGP 220. The second LGP 250 guides a path of infrared lights inputted in accordance with a touch operation, to the first sensor array 260. The second LGP 250 has a wedge shape.

The third LGP 252 is below (e.g., overlaps) a second area of the first LGP 220 which is different and not overlapping the first area. The third LGP 252 guides a path of infrared lights inputted in accordance with a touch operation, to the second sensor array 262. The third LGP 252 has a wedge shape.

The second and third LGPs 250 and 252 are symmetrical with respect to a center of the first LGP 220. The second and third LGPs 250 and 252 may be substantially integrated with each other.

The first sensor array 260 is at a first side portion of the second LGP 250 to sense infrared lights guided by the second LGP 250.

The second sensor array 262 is at a first side portion of the third LGP 252 to sense infrared lights guided by the third LGP 252.

The another exemplary embodiment of the interactive display device 200 according to the invention may further include a diffusion sheet 270 between the LCD panel 210 and the first LGP 220.

The another exemplary embodiment of the interactive display device 200 according to the invention may further include a turning film 280 between the first LGP 220 and the second LGP 250, and between the first LGP 220 and the third LGP 252. The turning film 280 is below the first LGP 220 to reflect the white lights emitted from the first LGP 220 toward the LCD panel 210. In addition, the turning film 280 transmits the infrared lights which exit through surfaces of the first LGP 220 which are subsequently used in detecting a touch. That is, the turning film 280 provides the second LGP 250 and/or the third LGP 252 with the infrared lights which are inputted in accordance with a touch operation.

The another exemplary embodiment of the interactive display device 200 according to the invention may further include a first lenticular lens (not shown) between the second LGP 250 and the first sensor array 260. In addition, the interactive display device 200 may further include a second lenticular lens (not shown) between the third LGP 252 and the second sensor array 262.

According to the another exemplary embodiment of the invention, white LEDs are at long sides facing each other of a flat type LGP which guides white lights for displaying images, and infrared LEDs are at short sides facing each other of the flat type LGP. In addition, two wedge type LGPs which guide infrared lights for detecting a touch are below the flat type LGP and a stripe sensor array which senses lights for detecting a touch is at each of the thicker side surface of the two wedge type LGPs, so that a touch detection operation is performed without modification of an LCD panel.

Thus, an interactive display device may be realized without a decrease of an aperture ratio of an LCD panel, and a manufacturing cost of an interactive display device may be decreased.

Moreover, an electric noise, which is generated by switching elements for a display and a touch electrode for sensing a touch that are formed on an LCD panel, may be not generated, so that display characteristics of the interactive display device may be enhanced.

Furthermore, a wedge type LGP which guides infrared lights for detecting a touch is divided into two, so that a height of the two wedge type LGPs may be decreased compared to a height of just one wedge type LGP. Thus, a total thickness and a total weight of an interactive display device may be reduced.

Figure 6:
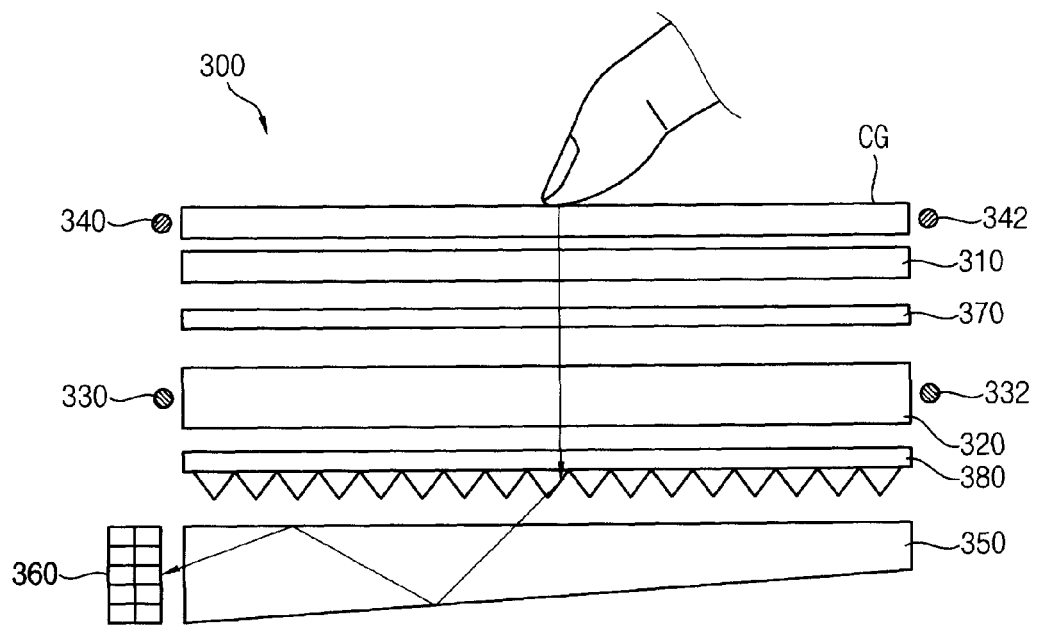
FIG. 6 is a cross-sectional view schematically illustrating still another exemplary embodiment of an interactive display device according to the invention.

FIG. 6 is a cross-sectional view schematically illustrating still another exemplary embodiment of an interactive display device according to the invention.

Referring to FIG. 6, an interactive display device 300 according to the invention includes an LCD panel 310, a first LGP 320, a first white LED part 330, a second white LED part 332, a cover glass CG, a first infrared LED part 340, a second infrared LED part 342, a second LGP 350, and a first sensor array 360. In the illustrated exemplary embodiment, the first and second LGPs 320 and 350, the first and second white LED parts 330 and 332, the first and second infrared LED parts 340 and 342 and the first sensor arrays 360 are below or on the LCD panel 310 and define a light sensing assembly which emits white lights for displaying an image and infrared light for detecting a touch.

The LCD panel 310 is substantially the same as the LCD panel 110 of FIGS. 1 and 2, and thus a detailed description thereof will be omitted.

The first LGP 320 is below the LCD panel 310. The first LGP 320 has a flat shape. The first LGP 320 includes a polymer resin having various characteristics such as high light transmittance, high heat resistance, high chemical resistance, high mechanical strength, etc.

The first white LED part 330 includes a plurality of white LEDs at a first side portion of the first LGP 320, and emits white lights for displaying an image. The first white LED part 330 is considered coplanar with the first LGP 320.

The second white LED part 332 includes a plurality of white LEDs at a second side portion of the first LGP 320, and emits white lights for displaying an image. The second side portion of the first LGP 320 at which the second white LED part 332 is disposed may face the first side portion of the first LGP 320 at which the first white LED part 330 is disposed. The second white LED part 332 is considered coplanar with the first LGP 320.

The cover glass CG is on the LCD panel 310 and guides infrared lights emitted from the first and second infrared LED parts 130 and 132, and protects the LCD panel 310 from an external impact. The cover glass CG may be the uppermost layer of the interactive display device 300 at the viewing/touching side of the LCD panel 310.

The first infrared LED part 340 includes a plurality of infrared LEDs at a first side portion of the cover glass CG. The first infrared LED part 340 emits infrared lights for detecting a touch. The first infrared LED part 340 is considered coplanar with the cover glass CG.

The second infrared LED part 342 includes a plurality of infrared LEDs at a second side portion of the cover glass CG. The second infrared LED part 342 emits infrared lights for detecting a touch. The second side portion of the cover glass CG at which the second infrared LED part 342 is disposed may face the first side portion of the cover glass CG at which the first infrared LED part 340 is disposed. The second infrared LED part 342 is considered coplanar with the cover glass CG.

In FIG. 6, when viewed from a plan view, the first white LED part 330 and the first infrared LED part 340 are parallel with each other, and the second white LED part 332 and the second infrared LED part 342 are parallel with each other. The first white LED part 330 may overlap the first infrared LED part 340 in the plan view. Alternatively, when viewed from the plan view, the first white LED part 330, the first infrared LED part 340, the second white LED part 332 and the second infrared LED part 342 may define a rectangular shape, such as illustrated in FIG. 5.

The second LGP 350 is below the first LGP 320. The second LGP 350 guides a path of infrared lights inputted in accordance with a touch operation.

The first sensor array 360 is at a side portion of the second LGP 350 to sense infrared lights guided by the second LGP 350.

The still another exemplary embodiment of the interactive display device 300 according to the invention may further include a diffusion sheet 370 between the LCD panel 310 and the first LGP 320, and a turning film 380 between the first LGP 320 and the second LGP 350.

According to the still another exemplary embodiment of the invention, white LEDs are at each of short sides facing each other of a flat type LGP which guides white lights for displaying images, and infrared LEDs are at each of short sides facing each other of the cover glass CG above the LCD panel. In addition, a wedge type LGP which guide infrared lights for detecting a touch is below the flat type LGP and a stripe sensor array which senses lights for detecting a touch is at a side surface of the wedge type LGP, so that a touch detection operation is performed without modification of an LCD panel.

Thus, an interactive display device may be realized without a decrease of an aperture ratio of an LCD panel, and a manufacturing cost of an interactive display device may be decreased.

Moreover, an electric noise, which is generated by switching elements for a display and a touch electrode for sensing a touch that are formed on an LCD panel, may be not generated, so that display characteristics of the interactive display device may be enhanced.

Furthermore, since infrared LEDs are at a side surface of a cover glass not a side surface of a flat type LGP which guides white lights for displaying images, usage efficiency of infrared lights may be increased.

Figure 7:
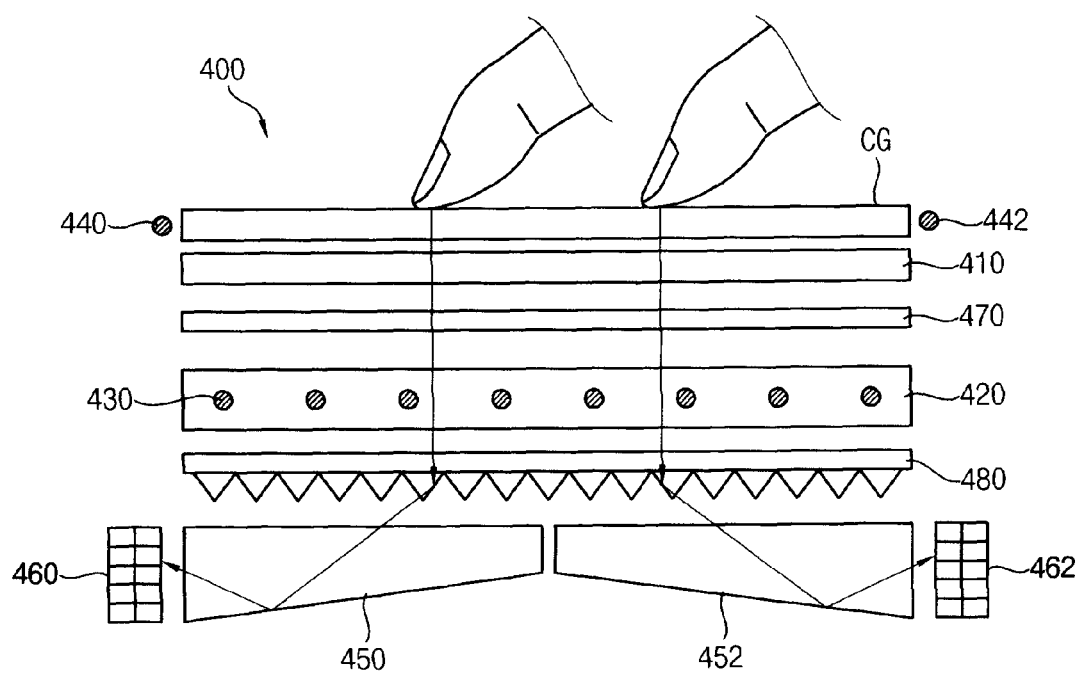
FIG. 7 is a cross-sectional view schematically illustrating further still another exemplary embodiment of an interactive display device according to the invention.

FIG. 7 is a cross-sectional view schematically illustrating further still another exemplary embodiment of an interactive display device according to the invention.

Referring to FIG. 7, an interactive display device 400 according to the invention includes an LCD panel 410, a first LGP 420, a first white LED part 430, a second white LED part (not shown), the cover glass CG, a first infrared LED part 440, a second infrared LED part 442, a second LGP 450, a third LGP 452, a first sensor array 460 and a second sensor array 462. In the illustrated exemplary embodiment, the first to third LGPs 420, 450 and 452, the first and second white LED parts 430, the first and second infrared LED parts 440 and 442 and the first and second sensor arrays 460 and 462 are below or on the LCD panel 410 to define as a light sensing assembly which emits white lights for displaying an image and infrared light for detecting a touch.

The LCD panel 410 is substantially the same as the LCD panel 110 of FIGS. 1 and 2, and thus a detailed description thereof will be omitted.

The first LGP 420 is below the LCD panel 410. The first LGP 420 has a flat shape. The first LGP 420 includes a polymer resin having various characteristics such as high light transmittance, high heat resistance, high chemical resistance, high mechanical strength, etc.

The first white LED part 430 includes a plurality of white LEDs at a first side portion of the first LGP 420, and emits white lights for displaying an image. The first white LED part 430 is considered coplanar with the first LGP 420, and the first side portion is a long side of the first LGP 420.

The second white LED part includes a plurality of white LEDs at a second side portion of the first LGP 420, and emits white lights for displaying an image. The second white LED part is considered coplanar with the first LGP 420, and the second side portion is a long side of the first LGP 420. The second side portion of the first LGP 420 at which the second white LED part is disposed may face the first side portion of the first LGP 420 at which the first white LED part 430 is disposed.

The cover glass CG is on the LCD panel 410.

The first infrared LED part 440 includes a plurality of infrared LEDs at a first side portion of the cover glass CG, and emits infrared lights for detecting a touch. The first infrared LED part 440 is considered coplanar with the cover glass CG, and the first side portion is a short side of the cover glass CG.

The second infrared LED part 442 includes a plurality of infrared LEDs. The second infrared LED part 442 is at a second side portion of the cover glass CG to emit infrared lights for detecting a touch. The second infrared LED part 442 is considered coplanar with the cover glass CG, and the second side portion is a short side of the cover glass CG. The second side portion of the cover glass CG at which the second infrared LED part 442 is disposed may face the first side portion of the cover glass CG at which the first infrared LED part 440 is disposed. Moreover, when viewed from a plan view, the first white LED part 430, the second white LED part, the first infrared LED part 440 and the second infrared LED part 442 define a rectangular shape.

The second LGP 450 is below the first LGP 420. The second LGP 450 guides a path of infrared lights inputted in accordance with a touch operation. The second LGP 450 has a wedge shape.

The third LGP 452 is below the first LGP 420 and parallel with the second LGP 450. The third LGP 452 guides a path of infrared lights inputted in accordance with a touch operation. The third LGP 452 has a wedge shape.

The second and third LGPs 450 and 452 are symmetrical with respect to a center of the first LGP 420. The second and third LGPs 450 and 452 may be separate elements as shown in FIG. 7, or may be substantially integrated with each other to form a single, unitary, indivisible element.

The first sensor array 460 is at a side portion of the second LGP 450 and senses infrared lights guided by the second LGP 450.

The second sensor array 462 is at a side portion of the third LGP 452 and senses infrared lights guided by the third LGP 452.

The further still another exemplary embodiment of the interactive display device 400 according to the invention may further include a diffusion sheet 470 between the LCD panel 410 and the first LGP 420, and a turning film 480 between the first LGP 420 and the second LGP 450 and between the first LGP 420 and the third LGP 452.

According to the further still another exemplary embodiment of the invention, white LEDs are at long sides facing each other of a flat type LGP which guides white lights for displaying images, and infrared LEDs are at short sides facing each other of the cover glass on an LCD panel. In addition, two wedge type LGPs which guide infrared lights for detecting a touch are below the flat type LGP, and a stripe sensor array which senses lights for detecting a touch is at each thicker side surface of the two wedge type LGPs, so that a touch detection operation is performed without modification of an LCD panel.

Thus, an interactive display device may be realized without a decrease of an aperture ratio of an LCD panel, and a manufacturing cost of an interactive display device may be decreased.

Moreover, an electric noise, which is generated by switching elements for a display and a touch electrode for sensing a touch that are formed on an LCD panel, may be not generated, so that display characteristics of the interactive display device may be enhanced.

Furthermore, a wedge type LGP which guides infrared lights for detecting a touch is divided into two similarly shaped members, so that a height of the two wedge type LGPs may be decreased compared to a height of just one wedge type LGP. Thus, a total thickness and a total weight of an interactive display device may be reduced.

Furthermore, since infrared LEDs are at a side surface of a cover glass not a side surface of a flat type LGP which guides white lights for displaying images, usage efficiency of infrared lights may be increased.

As described above, according to the invention, wedge type LGPs which guide infrared lights for detecting a touch are below an LGP which guides infrared lights for detecting a touch, and a stripe sensor array which senses lights for detecting the touch is at a side surface of the wedge type LGP, so that a touch detection operation is performed without modification of an LCD panel.

Thus, since the LCD panel does not include a touch electrode or a sensing line, an interactive display device may be realized without decreasing an aperture ratio of the LCD panel.

Moreover, since the LCD panel does not include a touch electrode or a sensing line, a mask, a material, an additional process, etc., for forming a touch electrode or a sensing line on an LCD panel are not required, and therefore a manufacturing cost of an interactive display device may be decreased.

Furthermore, since the LCD panel does not include a touch electrode or a sensing line, an electric noise which is generated by switching elements for a display and a touch electrode for sensing a touch on the LCD panel, may be reduced or effectively prevented. Therefore, display characteristics of the interactive display device may be enhanced.

Furthermore, when a wedge type LGP which guides infrared lights for detecting a touch is divided into two, a height of the two wedge type LGPs may be decreased compared to just the one wedge type LGP. Thus, an overall thickness and an overall weight of an interactive display device may be reduced.

Furthermore, when a cover glass is on an LGP which guides white lights for displaying images, and infrared LEDs are at a side surface of the cover glass, usage efficiency of infrared lights may be increased.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A light sensing assembly comprising:
   a first light guide plate;
   a light-emitting diode part at a side portion of the first light guide plate, wherein the light-emitting diode part emits white lights and the first light guide plate guides a path of the white lights to a display panel which displays an image by using the white lights;
   an infrared light-emitting diode part which emits infrared lights of a detected touch;
   a second light guide plate below the first light guide plate, wherein the second light guide plate guides a path of the infrared lights of the detected touch which are inputted in accordance with a touch operation;
   a third light guide plate below the first light guide plate and parallel with the second light guide plate, wherein the third light guide plate guides the path of the infrared lights of the detected touch inputted in accordance with the touch operation; and
   a first sensor array at a side portion of the second light guide plate, wherein the first sensor array senses the infrared lights which are guided by the second light guide plate;
   a second sensor array at a side portion of the third light guide plate, wherein the second sensor array senses the infrared lights which are guided by the third light guide plate,
   wherein the first light guide plate is between the display panel, and the second and third light guide plates.

2. The light sensing assembly of claim 1, wherein the second light guide plate has a wedge shape.

3. The light sensing assembly of claim 2,
wherein the white light-emitting diode part and the infrared light-emitting diode part are at a first side surface of the first light guide plate, and
wherein the first side surface of the first light guide plate is parallel with a longitudinal direction of the first sensor array.

4. The light sensing assembly of claim 3, wherein the white light-emitting diode part and the infrared light-emitting diode part are further at a second side surface of the first light guide plate which faces the first side surface.

5. The light sensing assembly of claim 1, further comprising:
a first lenticular lens between the first sensor array and the second light guide plate.

6. The light sensing assembly of claim 1, wherein the second and third light guide plates have a wedge shape, respectively, and are symmetrical with respect to a center of the first light guide plate.

7. The light sensing assembly of claim 1, further comprising:
a second lenticular lens between the second sensor array and the third light guide plate.

8. The light sensing assembly of claim 1, wherein
the white light-emitting diode part is at a first side surface of the first light guide plate, and
the infrared light-emitting diode part is at a third side surface adjacent to the first side surface of the first light guide plate.

9. The light sensing assembly of claim 8, wherein
the white light-emitting diode part is further at a second side surface which faces the first side surface, and
the infrared light-emitting diode part is further at a fourth side surface which faces the third side surface.

10. The light sensing assembly of claim 1, further comprising:
a turning film between the first light guide plate, and the second and third light guide plates,
wherein the turning film reflects the white lights which are emitted from the first light guide plate and transmits the infrared lights of the detected touch which exit through surfaces of the first light guide plate, toward the second and third light guide plates.

11. An interactive display device comprising:
a display panel which displays an image;
a first light guide plate below the display panel;
a white light-emitting diode part adjacent to a side portion of the first light guide plate, wherein the white light-emitting diode part emits white lights and the first light guide plate guides a path of the white lights to the display panel which displays the image by using the white lights;
an infrared light-emitting diode part which emits infrared lights;
a second light guide plate below the first light guide plate, wherein the second light guide plate guides a path of the infrared lights reflected in a touch operation at the display panel, to a first sensor array;
a third light guide plate below the first light guide plate and parallel with the second light guide plate, wherein the third light guide plate guides the path of the infrared lights reflected in the touch operation at the display panel to a second sensor array;
the first sensor array at a side portion of the second light guide plate, wherein the first sensor array senses the infrared lights which are guided by the second light guide plate, and
the second sensor array at a side portion of the third light guide plate, wherein the second sensor array senses the infrared lights which are guided by the third light guide plate,
wherein the first light guide plate is between the display panel, and the second and third light guide plates.

12. The interactive display device of claim 11, wherein the second light guide plate has a wedge shape.

13. The interactive display device of claim 11, wherein the first sensor array is substantially parallel with the infrared light-emitting diode part.

14. The interactive display device of claim 11, further comprising:
a turning film between the first light guide plate, and the second and third light guide plates,
wherein the turning film reflects the white lights emitted from the first light guide plate, toward the display panel, and transmits the reflected infrared lights which exit through surfaces of the first light guide plate, toward the second and third light guide plates.

15. The interactive display device of claim 11, further comprising:
a cover glass on the display panel which opposes the first light guide plate,
wherein the infrared light-emitting diode part is adjacent to a side portion of the cover glass.

16. The interactive display device of claim 15, wherein
the white light-emitting diode part is respectively at each of first sides of the first light guide plate, which face each other, and
the infrared light-emitting diode part is respectively at each of first sides of the cover glass, which face each other.

17. The interactive display device of claim 16, wherein
the first sides of the first light guide plate and the first sides of the cover glass are adjacent to each other in a plan view, such that the white light-emitting diode part at a side portion of the first light guide plate and the infrared light-emitting diode part at a side portion of the cover glass define a rectangular shape when viewed in the plan view.

18. An interactive display device comprising:
a display panel which displays an image;
a first light guide plate below the display panel;
a white light-emitting diode part at a side portion of the first light guide plate, wherein the white light-emitting diode part emits white lights and the first light guide plate guides a path of the white lights to the display panel which displays the image;
an infrared light-emitting diode part at a first side of the first light guide plate, wherein the infrared light-emitting diode part emits infrared lights;
a second light guide plate below a first area of the first light guide plate, wherein the second light guide plate guides a path of the infrared lights reflected in a touch operation at the display panel;
a third light guide plate below a second area of the first light guide plate different than the first area, wherein the third light guide plate guides a path of the reflected infrared lights;
a first sensor array at a first side portion of the second light guide plate, wherein the first sensor array senses the reflected infrared lights which are guided by the second light guide plate; and
a second sensor array at a first side portion of the third light guide plate, wherein the second sensor array senses the reflected infrared lights which are guided by the third light guide plate, wherein the first light guide plate is between the display panel, and the second and third light guide plates.

19. The interactive display device of claim 18, wherein the second and third light guide plates have a wedge shape, respectively, and are symmetrical with respect to a center of the first light guide plate.

20. The interactive display device of claim 18, further comprising:
   a first lenticular lens between the first sensor array and the second light guide plate; and
   a second lenticular lens between the second sensor array and the third light guide plate.

* * * * *